(12) United States Patent
Oshiumi et al.

(10) Patent No.: US 12,435,202 B2
(45) Date of Patent: Oct. 7, 2025

(54) METAL-CROSSLINKABLE POLYMER COMPOSITION, METAL-CROSSLINKED POLYMERIC MATERIAL, METAL COMPONENT, AND WIRING HARNESS

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP); KYUSHU UNIVERSITY, NATIONAL UNIVERSITY CORPORATION, Fukuoka (JP)

(72) Inventors: Naoyuki Oshiumi, Yokkaichi (JP); Takehiro Hosokawa, Yokkaichi (JP); Makoto Mizoguchi, Fukuoka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Mie (JP); KYUSHU UNIVERSITY, NATIONAL UNIVERSITY CORPORATION, Fukuoka (JP)

(*) Notice: Subject to any disclaimer, the term of this patent is extended or adjusted under 35 U.S.C. 154(b) by 488 days.

(21) Appl. No.: 17/914,182

(22) PCT Filed: Mar. 25, 2021

(86) PCT No.: PCT/JP2021/012501
§ 371 (c)(1),
(2) Date: Sep. 23, 2022

(87) PCT Pub. No.: WO2021/193811
PCT Pub. Date: Sep. 30, 2021

(65) Prior Publication Data
US 2023/0265263 A1 Aug. 24, 2023

(30) Foreign Application Priority Data

Mar. 27, 2020 (JP) .............................. 2020-058326

(51) Int. Cl.
*C08K 5/00* (2006.01)
*C08F 22/06* (2006.01)
(Continued)

(52) U.S. Cl.
CPC ............ *C08K 5/0091* (2013.01); *C08F 22/06* (2013.01); *C08F 36/06* (2013.01); *C08L 9/00* (2013.01);
(Continued)

(58) Field of Classification Search
None
See application file for complete search history.

(56) References Cited

U.S. PATENT DOCUMENTS

2002/0022700 A1  2/2002  Chino et al.
2004/0010090 A1  1/2004  Chino et al.
(Continued)

FOREIGN PATENT DOCUMENTS

JP  H05-106045 A  4/1993
JP  H05-239292 A  9/1993
(Continued)

OTHER PUBLICATIONS

JP 2015-086281 A , 2015, machine translation (Year: 2015).*
(Continued)

*Primary Examiner* — Satya B Sastri
(74) *Attorney, Agent, or Firm* — Oliff PLC (57) ABSTRACT

A metal-crosslinkable polymer composition and a metal crosslinked polymeric material having excellent curing rate and storage stability, and a metal member and a wiring harness to which the metal-crosslinkable polymer composi-
(Continued)

tion and the metal crosslinked polymeric material are applied. The metal-crosslinkable polymer composition includes an ingredient A which releases a metal ion when heated, and an ingredient B includes an organic polymer having a substituent group capable of forming an ionic bond with the metal ion released from the ingredient A. The metal-crosslinked polymeric material includes a crosslinked product of the metal-crosslinkable polymer composition. The metal member has a metal base member and a coating member covering a surface of the metal base member, where the coating member includes the metal-crosslinked polymeric material. The wiring harness includes the metal-crosslinked polymeric material.

13 Claims, 3 Drawing Sheets

(51) Int. Cl.
  *C08F 36/06* (2006.01)
  *C08L 9/00* (2006.01)
(52) U.S. Cl.
  CPC ..... *C08L 2203/206* (2013.01); *C08L 2312/00* (2013.01)

(56) References Cited

U.S. PATENT DOCUMENTS

| | | | |
|---|---|---|---|
| 2004/0029990 | A1 | 2/2004 | Fujita et al. |
| 2008/0254216 | A1 | 10/2008 | Kadota et al. |
| 2009/0087667 | A1 | 4/2009 | Tomizaki et al. |
| 2010/0256027 | A1 | 10/2010 | Miyamoto et al. |
| 2014/0378612 | A1 | 12/2014 | Dinkar et al. |
| 2015/0291834 | A1 | 10/2015 | Isotani et al. |
| 2017/0062954 | A1 | 3/2017 | Hase et al. |
| 2017/0243673 | A1 | 8/2017 | Nakashima et al. |
| 2017/0313918 | A1 | 11/2017 | Kasahara et al. |
| 2019/0106652 | A1 | 4/2019 | Takata et al. |
| 2019/0143730 | A1 * | 5/2019 | Kuse .......... G03F 7/20 101/451 |
| 2020/0332100 | A1 | 10/2020 | Ashihara et al. |
| 2020/0392350 | A1 | 12/2020 | Oshiumi et al. |
| 2022/0242981 | A1 | 8/2022 | Aoki et al. |
| 2023/0265263 | A1 | 8/2023 | Oshiumi et al. |

FOREIGN PATENT DOCUMENTS

| | | | | |
|---|---|---|---|---|
| JP | H07-041636 | A | | 2/1995 |
| JP | H11-235872 | A | | 8/1999 |
| JP | H11-314672 | A | | 11/1999 |
| JP | 2000-178456 | A | | 6/2000 |
| JP | 2000-212359 | A | | 8/2000 |
| JP | 2001-342305 | A | | 12/2001 |
| JP | 2002-20579 | A | | 1/2002 |
| JP | 2002-317122 | A | | 10/2002 |
| JP | 2004-35822 | A | | 2/2004 |
| JP | 2004-51814 | A | | 2/2004 |
| JP | 2005-054087 | A | | 3/2005 |
| JP | 3958201 | B2 | * | 8/2007 ........... C03C 25/106 |
| JP | 2008-163239 | A | | 7/2008 |
| JP | 2009-82781 | A | | 4/2009 |
| JP | 2010-92782 | A | | 4/2010 |
| JP | 2010-096416 | A | | 4/2010 |
| JP | 2011-162673 | A | | 8/2011 |
| JP | 2015-509995 | A | | 4/2015 |
| JP | 2015086281 | A | * | 5/2015 |
| JP | 2015-106141 | A | | 6/2015 |
| JP | 2015-151614 | A | | 8/2015 |
| JP | 2016-050288 | A | | 4/2016 |
| JP | 2016-098333 | A | | 5/2016 |
| JP | 2017-179040 | A | | 10/2017 |
| JP | 2018-080327 | A | | 5/2018 |
| JP | 2019-157209 | A | | 9/2019 |
| JP | 2020-033429 | A | | 3/2020 |
| JP | 2020-161398 | A | | 10/2020 |
| JP | 2020-164837 | A | | 10/2020 |
| JP | 2020-176257 | A | | 10/2020 |
| JP | 2021-8613 | A | | 1/2021 |
| JP | 2021-155600 | A | | 10/2021 |
| WO | 2005/087697 | A1 | | 9/2005 |
| WO | 2007/052522 | A1 | | 5/2007 |
| WO | 2014/057858 | A1 | | 4/2014 |
| WO | 2016/067891 | A1 | | 5/2016 |
| WO | 2017/117499 | A1 | | 7/2017 |
| WO | 2017/204046 | A1 | | 11/2017 |
| WO | 2019/189723 | A1 | | 10/2019 |

OTHER PUBLICATIONS

JP 3958201 B2, 2007, machine translation (Year: 2007).*
Oct. 17, 2023 Office Action issued in Japanese Patent Application No. 2020-058326.
May 18, 2021 Search Report issued in International Patent Application No. PCT/JP2021/012501.
Sep. 29, 2022 International Preliminary Report on Patentability issued in International Patent Application No. PCT/JP2021/012501.
Feb. 22, 2022 International Search Report issued in International Patent Application No. PCT/JP2021/044193.
Brahma, S. et al. "Zinc acetylacetonate hydrate adducted with nitrogen donor ligands: Synthesis, spectroscopic characterization, and thermal analysis". Journal of Molecular Structure, 1101 (2015) 41-49.
Purkayastha, D.D. et al. "Surfactant controlled low-temperature thermal decomposition route to zinc oxide nanorods from zinc(II) acetylacetonate monohydrate". Journal of Luminescence, 154 (2014) 36-40.
Oct. 18, 2022 Search Report issued in International Patent Application No. PCT/JP2022/032375.
U.S. Appl. No. 18/682,344, filed Feb. 8, 2024 in the name of Sato et al.
Dec. 21, 2021 Search Report issued in International Patent Application No. PCT/JP2021/039800.
U.S. Appl. No. 18/033,856, filed Apr. 26, 2023 in the name of Oshiumi et al.
U.S. Appl. No. 18/038,141, filed May 22, 2023 in the name of Oshiumi et al.
Oct. 18, 2022 Search Report issued in International Patent Application No. PCT/JP2022/032374.
U.S. Appl. No. 18/682,368, filed Feb. 8, 2024 in the name of Sato et al.
Jan. 28, 2025 Office Action issued in Japanese Patent Application No. 2023-545548.
Apr. 4, 2024 Office Action issued in Chinese Patent Application No. 202180082057.9.
Jul. 2, 2024 Office Action Issued in Japanese Patent Application No. 2022-568223.
Jan. 28, 2025 Office Action issued in Japanese Patent Application No. 2023-545549.
Jun. 25, 2025 Office Action issued in U.S. Appl. No. 18/038,141.
PubChem—Bis(acetylacetonato)titanium oxide—accessed Jun. 16, 2025 (Year: 2025).

* cited by examiner

METAL-CROSSLINKABLE POLYMER COMPOSITION, METAL-CROSSLINKED POLYMERIC MATERIAL, METAL COMPONENT, AND WIRING HARNESS

TECHNICAL FIELD

The present disclosure relates to a metal-crosslinkable polymer composition and a metal-crosslinked polymeric material suitable as an adhesive material and a curing molding material, and to a metal member and a wiring harness to which the metal-crosslinkable polymer composition and the metal-crosslinked polymeric material are applied.

BACKGROUND ART

Various curing types of adhesive materials and curing molding materials are known, such as a photocurable material, a moisture curable material, an anaerobic curable material, a cationic curable material, an anionic curable material, a thermosetting material, or the like. For example, an epoxy curable material is known as the thermosetting material (Patent Literature 1).

CITATION LIST

Patent Literature

Patent Literature 1: JP 2016-098333 A

SUMMARY OF APPLICATION

Problems to be Solved by the Application

The moisture curable material, the cationic curable material, the anionic curable material, and the thermosetting material have a problem of taking a long time to cure. The anaerobic curable material requires blocking an entrance of oxygen during curing. The photocurable material cures relatively fast, but a difficulty lies in curing in areas which are hardly lighted. The adhesive material and the curing molding material require fast curing in view of tact time reduction and contamination reduction, or the like. On the other hand, the adhesive material and the curing molding material also require storage stability, i.e., they do not cure before use and suppress a change in quality during stored at room temperature, etc.

The problem to be solved by the present disclosure is to provide a metal-crosslinkable polymer composition and a metal-crosslinked polymeric material with excellent curing rate and storage stability, and a metal member and a wiring harness to which the metal-crosslinkable polymer composition and the metal-crosslinked polymeric material are applied.

Means of Solving the Problems

The metal-crosslinkable polymer composition of the present disclosure includes an ingredient A which releases a metal ion when heated, and an ingredient B which comprises an organic polymer having a substituent group capable of forming an ionic bond with the metal ion released from the ingredient A.

The metal-crosslinked polymeric material of the present disclosure comprises a crosslinked product of the metal-crosslinkable polymer composition of the present disclosure.

The metal member according to the present disclosure comprises a metal base member and a coating member covering a surface of the metal base member, wherein the coating member comprises the metal-crosslinkable polymeric material according to the present disclosure.

A wiring harness of the present disclosure comprises the metal-crosslinked polymeric material of the present disclosure.

Advantageous Effects of Invention

The metal-crosslinkable polymer composition of the present disclosure has excellent curing rate and storage stability.

DESCRIPTION OF EMBODIMENTS

Explanation of Embodiments According to Present Disclosure

First, embodiments of the present disclosure are listed and explained.
(1) A metal-crosslinkable polymer composition of the present disclosure comprises an ingredient A which releases a metal ion when heated; an ingredient B which comprises an organic polymer having a substituent group capable of forming an ionic bond with the metal ion released from the ingredient A. To this end, excellent curing rate and storage stability are shown.
(2) It is preferable that the ingredient A has a decomposition point or a phase transition point from 50° C. to 200° C. With this arrangement, excellent storage stability is shown, such that the metal ion is easily suppressed from being released from the ingredient A during the preparation of the metal-crosslinkable polymer composition and before the use of the metal-crosslinkable polymer composition, so that a curing of the metal-crosslinkable polymer composition is suppressed, and a change in quality during stored of the metal-crosslinkable polymer composition at room temperature, etc. is suppressed. Further, the ingredient A decomposes or undergoes a phase transition at an appropriate temperature, whereby the metal ion is easily released from the ingredient A, and excellent curing rate is shown when using the metal-crosslinkable polymer composition.
(3) It is preferable that the ingredient A is a metal complex. With this arrangement, the metal ion shows excellent stabilization effect by a ligand, the metal ion is easily suppressed from being released from the ingredient A during the preparation of the metal-crosslinkable polymer composition and before the use of the metal-crosslinkable polymer composition, and the metal ion is easily released from the ingredient A by heat when using the metal-crosslinkable polymer composition.
(4) It is preferable that the ingredient A is a metal complex comprising a multidentate ligand or a crosslinking ligand. Coordinations by the multidentate ligand or the crosslinking ligand are more effective in stabilizing the metal ion by the ligand than a non-crosslinking coordination by a monodentate ligand, whereby the metal ion is more easily suppressed from being released from the ingredient A during the preparation of the metal-crosslinkable polymer composition and before the use of the metal-crosslinkable polymer composition.

(5) It is preferable that the ingredient A is a metal complex comprising a β-diketonato ligand or an alkoxide ligand. The β-diketonato ligand and the alkoxide ligand coordinate stably to the metal ion. The β-diketonato ligand and the alkoxide ligand can easily form a multidentate coordination or a crosslinking coordination, which are more effective in stabilizing the metal ion by these ligand than the non-crosslinking coordination by the monodentate ligand, whereby the metal ion is more easily suppressed from being released from the ingredient A during the preparation of the metal-crosslinkable polymer composition and before the use of the metal-crosslinkable polymer composition.

(6) It is preferable that the metal of the metal ion released from the ingredient A is at least one selected from the group consisting of alkaline earth metals, zinc, titanium, and aluminum. With this arrangement, the metal of the metal ion has a valence of two or higher and excellent stability is shown in the metal-crosslinked polymeric material comprised of a crosslinked product of the metal-crosslinkable polymer composition.

(7) It is preferable that the substituent group of the ingredient B is an electron-attractive group. With this arrangement, an ionic bond is easily formed with the metal ion released from the ingredient A.

(8) It is preferable that the substituent group of the ingredient B is at least one selected from the group consisting of carboxylic acid groups, acid anhydride groups, phosphoric acid groups and sulfonic acid groups.

(9) It is preferable that the ingredient B is in a liquid state at 150° C. or lower. With this arrangement, the metal-crosslinkable polymer composition can be applied to a metal surface at a relatively low temperature.

(10) It is preferable that the ingredient A contains 0.2 parts by mass or larger and 30 parts by mass or smaller with respect to 100 parts by mass of the ingredient B. With this arrangement, the metal-crosslinkable polymer composition shows excellent curing rate and storage stability.

(11) Further, the metal-crosslinked polymeric material of the present disclosure comprises the crosslinked product of the metal-crosslinkable polymer composition. With this arrangement, excellent curing rate and storage stability are shown.

(12) Still further, the metal member of the present disclosure has a metal base member and a coating member covering the surface of the metal base member, in which the coating member comprises the metal crosslinked polymeric material of the present disclosure. To this end, excellent anticorrosive effect is shown.

(13) Further, the wiring harness of the present disclosure comprises the metal-crosslinked polymeric material of the present disclosure. To this end, excellent anticorrosive effect is shown.

DETAILS OF EMBODIMENTS ACCORDING TO PRESENT DISCLOSURE

Concrete examples of a metal-crosslinkable polymer composition, a metal-crosslinked polymeric material, a metal member, and a wiring harness according to the present disclosure are explained hereunder in reference to the drawings. However, the present disclosure is not limited to those examples.

The metal-crosslinkable polymer composition comprises: an ingredient A which releases a metal ion when heated; and an ingredient B which comprises an organic polymer having a substituent group capable of forming an ionic bond with the metal ion released from the ingredient A.

The ingredient A is an ingredient that releases the metal ion when heated. The term "heated" is used assuming that the ingredient A is heated at a temperature higher than room temperature. The sentence "releases the metal ion" is used to mean that the metal ion is released from the ingredient A due to decomposition or phase transition of the ingredient A.

It is preferable that the ingredient A has a decomposition point or a phase transition point from 50° C. to 200° C. With this arrangement, excellent storage stability is shown, such that the metal ion is easily suppressed from being released from the ingredient A during the preparation of the metal-crosslinkable polymer composition and before the use of the metal-crosslinkable polymer composition, so that a curing of the metal-crosslinkable polymer composition is suppressed, and a change in quality during stored of the metal-crosslinkable polymer composition at room temperature, etc. is suppressed. Further, the ingredient A decomposes or undergoes a phase transition at an appropriate temperature, whereby the metal ion is easily released from the ingredient A, and excellent curing rate is shown when using the metal-crosslinkable polymer composition. From the above viewpoint, the ingredient A preferably has a decomposition point or a phase transition point at 60° C. or higher, and more preferably at 70° C. or higher. Further, from the above viewpoint, the ingredient A preferably has a decomposition point or a phase transition point at 150° C. or lower, and more preferably at 120° C. or lower. The decomposition point or a phase transition point of the ingredient A is expressed as a temperature at which a baseline change starts by differential scanning calorimetry (DSC) (measurement temperature range: 25° C. to 200° C., measured in the air). In addition, the phase transition point does not include a melting point, and the phase transition does not include melting.

Examples of the metal of the metal ion released from the ingredient A include alkaline earth metals, zinc, titanium, aluminum, iron, nickel, copper, zirconium, etc. It is preferable that the metal of the metal ion is at least one selected from the group consisting of the above-mentioned metals. The metal of the metal ion may be comprised alone or two or more of the above-mentioned metals. The metal of the metal ion is preferably at least one selected from the group consisting of alkaline earth metals, zinc, titanium, and aluminum. With this arrangement, the metal ion of the above-mentioned metal has a valence of two or higher, and excellent stability is shown in the metal-crosslinked polymeric material comprised of a crosslinked product of the metal-crosslinkable polymer composition. Among the preferable metal species mentioned above, zinc is particularly preferable. With this arrangement, particularly excellent stability is shown in the metal-crosslinked polymeric material comprised of the crosslinked product of the metal-crosslinkable polymer composition.

Examples of the ingredient A include a metal complex. The metal complex comprises a ligand having a non-covalent electron pair coordinately bonded to a central metal ion. It is preferable that the ingredient A is the metal complex. With this arrangement, the metal ion shows excellent stabilization effect by the ligand, the metal ion is easily suppressed from being released from the ingredient A during the preparation of the metal-crosslinkable polymer composition and before the use of the metal-crosslinkable polymer composition, and the metal ion is easily released from the ingredient A by heat when using the metal-crosslinkable polymer composition.

The ligand of the metal complex has a group with an isolated electron pair, which is coordinately bonded with the metal ion to form the metal complex. The examples of the ligand include the monodentate ligand with a single coordination site and the multidentate ligand with two or more coordination sites. The metal complex formed by the multidentate ligand shows excellent stability more than that formed by the monodentate ligand due to chelating effect. Further, the types of the ligand include a non-crosslinking ligand in which one ligand coordinates to one metal ion and a crosslinking ligand in which one ligand coordinates to two or more metal ions. The crosslinking ligand may be comprised of the monodentate ligand or the multidentate ligand.

It is preferable that the ingredient A is the metal complex comprising the multidentate ligand or the crosslinking ligand. Coordinations by the multidentate ligand or the crosslinking ligand are more effective in stabilizing the metal ion by these ligand than the non-crosslinking coordination by the monodentate ligand, whereby the metal ion is easily suppressed from being released from the ingredient A during the preparation of the metal-crosslinkable polymer composition and before the use of the metal-crosslinkable polymer composition.

Examples of the ligand for the metal complex include the β-diketonato ligand (1,3-diketonato ligand) and the alkoxide ligand. The β-diketonato ligand is represented by the following general formula (1). The alkoxide ligand is represented by the following general formula (2). Examples of the β-Diketonato ligand include an acetylacetonato ligand (acac), a 2,2,6,6-tetramethyl-3,5-heptanedionato ligand (dpm), a 3-methyl-2,4-pentadionato ligand, a 3-ethyl-2,4-pentadionato ligand, a 3,5-heptadionato ligand, a 2,6-dimethyl-3,5-heptanedionato ligand, and a 1,3-diphenyl-1,3-propanedionato ligand, etc. Examples of the alkoxide ligand include a methoxide ligand, an ethoxide ligand, an isopropoxide ligand, a n-propoxide ligand, and n-butoxide ligands, etc.

(1)

In formula (1), R1, R2, and R3 represent a hydrocarbon group. R1, R2, R3 may be a hydrocarbon group of the same structure as each other or of a different structure from each other. R1, R2, R3 may be an aliphatic hydrocarbon group or a hydrocarbon group containing an aromatic ring. R1, R2, and R3 may be a hydrocarbon group having from 1 to 10 carbons. R3 may be a hydrogen. The case is included where at least two of R1, R2, and R3 are interconnected by a ring structure.

(2)

In formula (2), R4 represents hydrocarbon groups. R4 may be the aliphatic hydrocarbon group or the hydrocarbon group containing the aromatic ring. R4 may be a hydrocarbon group having from 1 to 10 carbons.

It is preferable that the ingredient A is a metal complex comprising the β-diketonato ligand or the alkoxide ligand. The β-diketonato ligand and the alkoxide ligand coordinate stably to the metal ion. The β-diketonato ligand and the alkoxide ligand can easily form the multidentate coordination or the crosslinking coordination, which are more effective in stabilizing the metal ion by these ligand than the non-crosslinking coordination by the monodentate ligand, whereby the metal ion is easily suppressed from being released from the ingredient A during the preparation of the metal-crosslinkable polymer composition and before the use of the metal-crosslinkable polymer composition.

The ingredient B is an ingredient comprising the organic polymer having the substituent group capable of forming an ionic bond with the metal ion released from the ingredient A. Examples of the substituent groups capable of forming an ionic bond with the metal ion include carboxylic acid groups, acid anhydride groups, phosphoric acid groups, and sulfonic acid groups, etc. The substituent group does not include hydroxyl groups. The substituent group may be alone or two or more of the exemplified substituent groups. It is preferable that the substituent group is at least one of the exemplified substituent groups. With the arrangement, the ionic bond is easily formed with the metal ion released from the ingredient A. Further, it is preferable that the substituent group is the electron-attractive group. With this arrangement, the ionic bond is easily formed with the metal ion released from the ingredient A.

Although the content of the substituent group in the ingredient B is not particularly limited, from the viewpoint of securing physical properties due to cross-linking, etc., it is preferable that the ingredient B contains the substituent group in an amount of 0.01 parts by mass or larger and 10 parts by mass or smaller, more preferably in an amount of 0.1 parts by mass or larger and 5 parts by mass or smaller, and even more preferably in an amount of 0.2 parts by mass or larger and 3 parts by mass or smaller.

The content of the substituent group in the ingredient B is determined by comparing a specific peak size of the substituent group in an infrared spectral with a spectral peak size of a material whose content is known.

The organic polymer in the ingredient B is the organic polymer such as resin, rubber, and elastomer. The ingredient B may be in a liquid state at room temperature or in a solid state at room temperature, but it is preferable that the ingredient B is in a liquid state at 150° C. or lower. With this arrangement, the metal-crosslinkable polymer composition can be applied to a metal surface at a relatively low temperature. Further, it is preferable that the ingredient B is in a liquid state at room temperature. With this arrangement, the metal-crosslinkable polymer composition can be applied to a metal surface, etc. at room temperature. Also, this arrangement allows an easier preparation of the metal-crosslinkable polymer composition. Additionally, it is preferable that the ingredient B has a molecular weight of 1000 or more. With this arrangement, the ingredient B is easily cured by cross-linking, even if being in a liquid state at room temperature. On the other hand, from a viewpoint of a tendency to become in a liquid state at room temperature, it is preferable that the ingredient B has a molecular weight of 100000 or less. It is more preferable that the ingredient B has a molecular weight of 50000 or less. The molecular weight of the ingredient B is expressed as a number average molecular weight (Mn) using gel permeation chromatography (GPC) analysis.

Examples of the organic polymer in the ingredient B include polyolefin, polybutadiene, polyisoprene, polyacrylate, polymethacrylate, polyurethane, polyester, and organopolysiloxane (silicone), etc. The substituent group of the ingredient B may be introduced into a main chain of the organic polymer or into a side chain of the organic polymer. From a view point of flowability at room temperature, etc., polybutadiene and polyisoprene are more preferable as the organic polymer of the ingredient B.

In the metal-crosslinkable polymer composition, it is preferable that the ingredient A contains 0.2 parts by mass or larger and 30 parts by mass or smaller with respect to 100 parts by mass of the ingredient B. With this arrangement, the metal-crisslinkable polymer composition shows excellent curing rate and storage stability. Further, from the viewpoint, a lower limit of a content of the ingredient A is more preferably 0.5 parts by mass or larger, even more preferably 1.0 parts by mass or larger. In addition, an upper limit of a content of the ingredient A is more preferably 20 parts by mass or smaller, even more preferably 15 parts by mass or smaller, yet more preferably 10 parts by mass or smaller or 5.0 parts by mass or smaller.

The metal-crosslinkable polymer composition of the present disclosure may contain an additive such as diluent, dispersant, and colorant as appropriate, to an extent that the additive does not interfere with a function of a material.

The metal-crosslinkable polymer composition can be easily prepared by mixing the ingredient A and the ingredient B. In the preparation of the metal-crosslinkable polymer composition, heat may be applied if necessary.

According to the metal-crosslinkable polymer composition of the present disclosure having the above-described composition, the ingredient A releases the metal ion when heated, and the metal ion released from the ingredient A forms an ionic bond with the substituent group of the ingredient B, whereby the organic polymer of the ingredient B is crosslinked via the ionic bond. A rate of forming the ionic bond is faster than a speed of forming a covalent bond, and thus the metal-crosslinkable polymer composition of the present disclosure shows excellent curing rate. In addition, the ingredient A is an ingredient which releases the metal ion when heated, and the ingredient A does not release the metal ion until the temperature at which the metal ion is released, and thus the cross-linking via the ionic bond does not proceed in the organic polymer of the ingredient B. Therefore, the metal-crosslinkable polymer composition of the present disclosure also shows excellent storage stability. Further, the metal-crosslinkable polymer composition of the present disclosure crosslinks the organic polymer of the ingredient B via the ionic bond, and a bonding force is stronger than a van der Waals force, whereby forming a tough crosslinked product. Further, the metal-crosslinkable polymer composition of the present disclosure shows excellent heat resistance and chemical resistance because the organic polymer of the ingredient B is crosslinked via the ionic bond.

The metal-crosslinkable polymer composition of the present disclosure is easily crosslinked and cured by heat. The metal-crosslinked polymeric material of the present disclosure comprises the crosslinked product of the metal-crosslinkable polymer composition according to the present disclosure.

The metal-crosslinkable polymer composition of the present disclosure can be suitably used as an adhesive material, and a curing molding material. And it is also used for an anticorrosive purpose, etc. For example, the metal-crosslinkable polymer composition can be used as an anticorrosive purpose that adheres to a surface of the metal base material to be protected and covers the metal base material to prevent a metal corrosion. Further, it can be used for an anticorrosion purpose as an anticorrosion agent, etc. for a terminal-fitted electric wire, for example.

Figure 1:
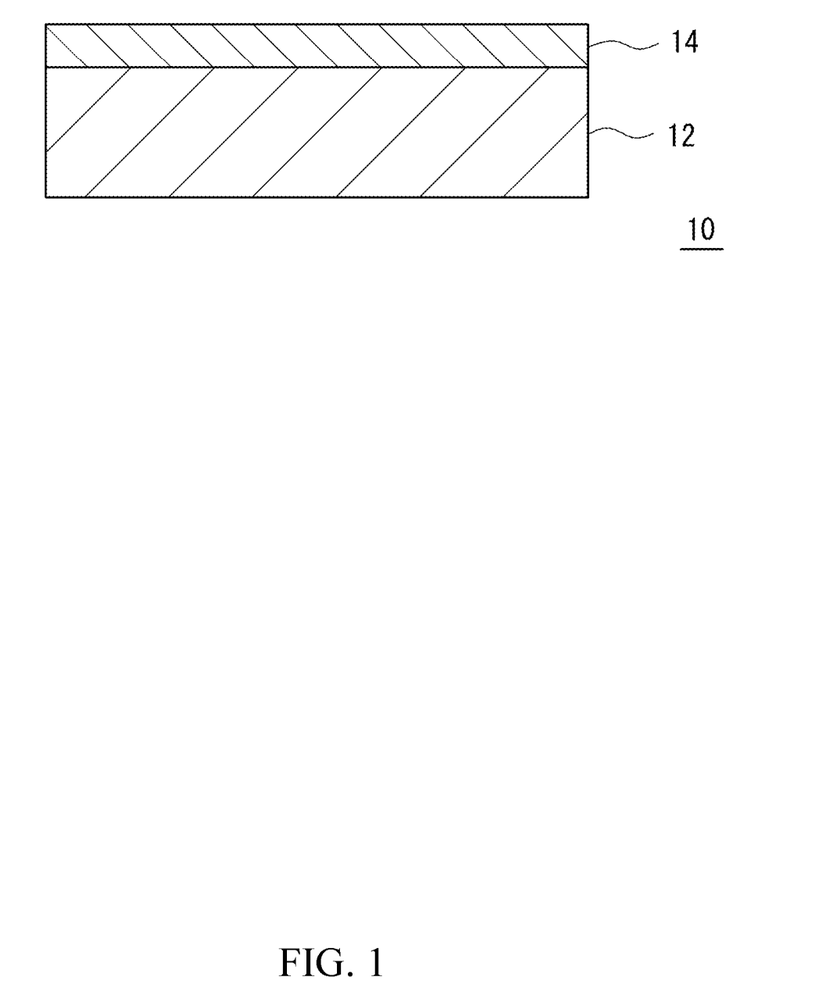
FIG. 1 is a cross-sectional view of a metal member according to an embodiment.

Next, the metal member of the present disclosure will be described. FIG. 1 shows a cross-sectional view of a metal member of an embodiment.

The metal member 10 comprises a metal base member 12, a coating member 14 covering the surface of the base member 12 comprises the metal-crosslinked polymeric material of the present disclosure. The metal member 10 of the present disclosure shows excellent antcorrosion effect because the coating member 14 is comprised of the metal-crosslinked polymeric material of the present disclosure.

Next, a wiring harness of the present disclosure will be described. The wiring harness of the present disclosure comprises the metal-crosslinked polymeric material of the present disclosure. Specifically, the metal-crosslinked polymeric material of the present disclosure is used as an anticorrosion agent covering an electric connection part between a terminal fitting and an electric wire in a wiring harness, a molding material for fixing parts, an adhesive material, etc.

Next, a terminal-fitted electric wire of the present disclosure will be described.

A terminal-fitted electric wire of the present disclosure contains an insulated wire and a terminal connected to an end of the conductor of the insulated wire. An electric connection part between the terminal and the conductor is covered with a metal-crosslinked polymeric material (i.e., a cured product of a metal-crosslinkable polymer composition of the present disclosure). Hence, the electric connection part is prevented from corroding.

Figure 2:
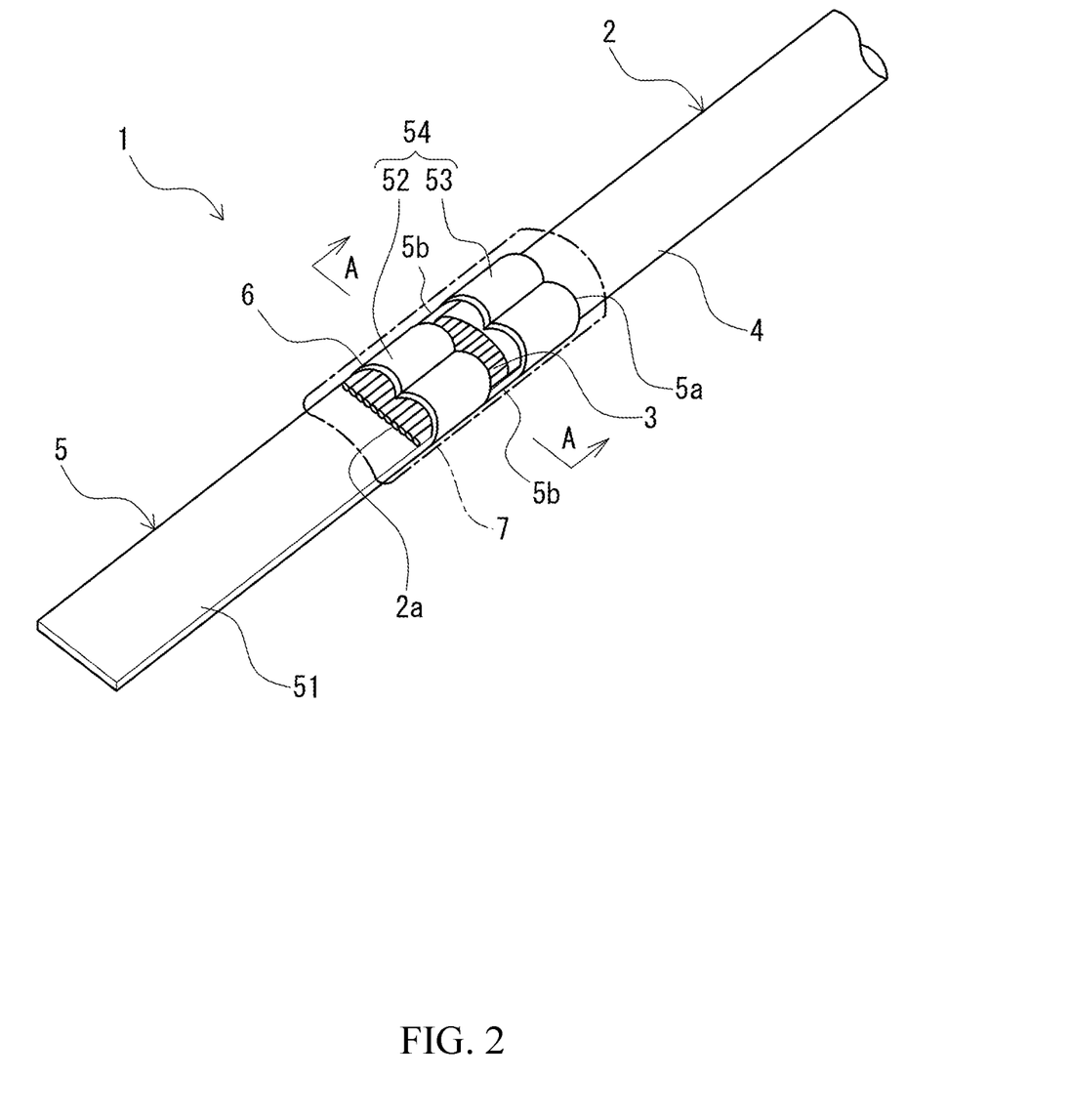
FIG. 2 shows a diagram of a wiring harness according to an embodiment.
Figure 3:
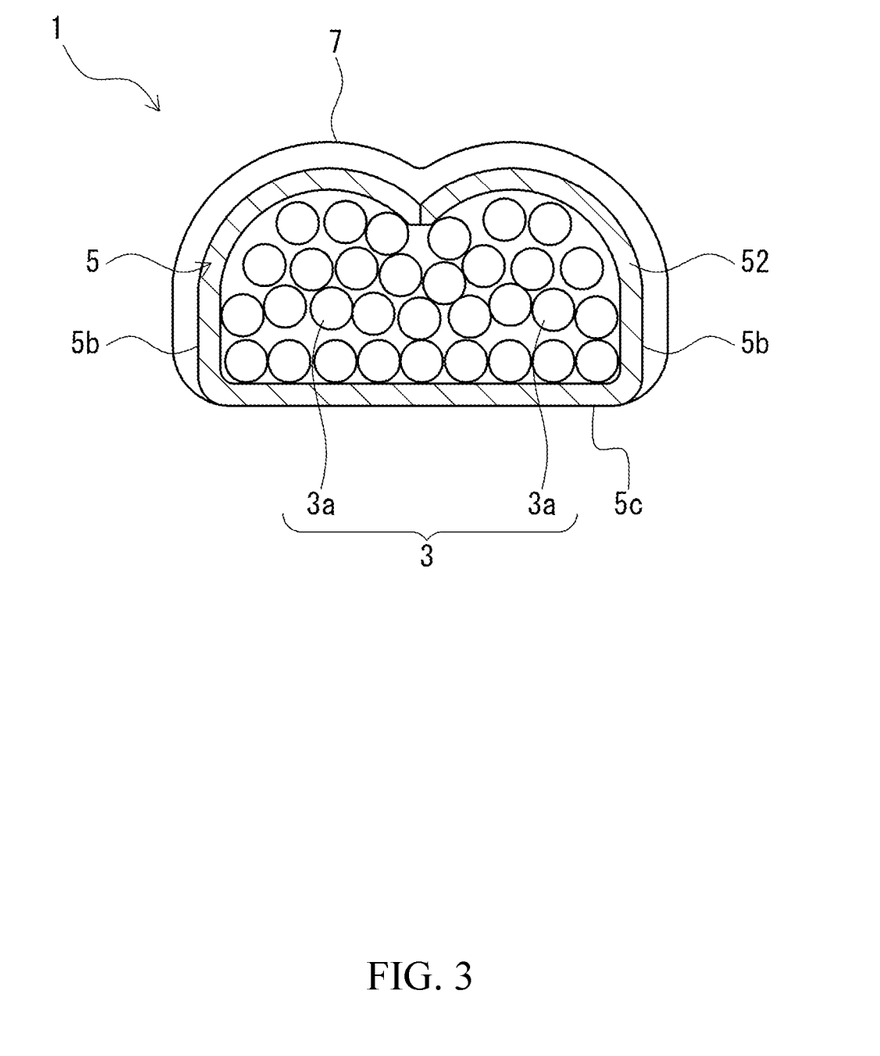
FIG. 3 is a longitudinal sectional view of the A-A line in FIG. 2.

FIG. 2 is a perspective view of a terminal fitted electric wire according to a preferred embodiment of the present disclosure, and FIG. 3 is a vertical cross sectional view along line A-A in FIG. 2. As illustrated in FIG. 2 and FIG. 3, a terminal-fitted electric wire 1 contains a covered electric wire 2 which contains an electric wire conductor 3 and an insulation covering (i.e., insulator) 4. The covered electric wire 2 and a terminal 5 are electrically connected through an electric connection part 6.

The terminal 5 has a tab-shaped connection part 51 formed as an elongate flat plate to be connected with a mating terminal, and an electric wire fixing part 54 containing a wire barrel 52 and an insulation barrel 53 formed at the extended end of the connection part 51. The terminal 5 can be formed (or fabricated) to a predetermined shape by pressing of a plate material made of a metal.

In the electric connection part 6, the insulation covering 4 at the end of the covered electric wire 2 is stripped off to expose the electric wire conductor 3, and the exposed electric wire conductor 3 is press-bonded to one side of the terminal 5 to connect the covered electric wire 2 with the terminal 5. The wire barrel 52 of the terminal 5 is crimped over the electric wire conductor 3 of the covered electric wire 2 to electrically connect the electric wire conductor 3 with the terminal 5. Further, the insulation barrel 53 of the terminal 5 is crimped over the insulation covering 4 of the covered electric wire 2.

In the terminal-fitted electric wire 1, an area surrounded by a dotted chain in FIG. 1 is covered with a cured product 7 of the present protection composition. Specifically, an area from the surface part of the terminal 5 ahead of the front end of the electric wire conductor 3 exposed from the insulation covering 4 to the surface part of the insulation covering 4 behind the backward end of the electric wire conductor 3 exposed from the insulation covering 4 is covered with the cured product 7. That is, the covered electric wire 2 is covered with the cured product 7 such that on the distal end 2a of the wire 2, the cured product 7 slightly extends off toward the connection part 51 of the terminal 5 from the distal end of the electric wire conductor 3. The terminal 5 is covered with the cured product 7 such that on an end edge 5a of the terminal 5, the cured product 7 slightly extends off toward the insulation covering 4 of the covered electric wire 2 from the end part of the insulation barrel 53. As shown in FIG. 3, side surfaces 5b of the terminal 5 are also covered with the cured product 7. Aback surface 5c of the terminal 5 may not be covered with the cured product 7 or may be covered with the cured product 7. The peripheral edge of the cured product 7 includes a part in contact with the surface of the terminal 5, a part in contact with the surface of the electric wire conductor 3, and a part in contact with the surface of the insulation covering 4.

In this way, the electric connection part 6 is covered with the cured product 7 at a predetermined thickness along the shape of the outer periphery of the terminal 5 and the covered electric wire 2. Thus, a part of the electric wire 2 where the electric wire conductor 3 is exposed from the insulation covering 4 is completely covered with the cured product 7 so as not to be exposed to the outside. Accordingly, the electric connection part 6 is completely covered with the cured product 7. Since the cured product 7 has excellent adhesion to all of the electric wire conductor 3, the insulation covering 4, and the terminal 5, the cured product 7 prevents intrusion of moisture from the outside to the electric wire conductor 3 and the electric connection part 6, which may cause corrosion of the metal parts. Further, since the cured product 7 is excellent in adhesion, a gap is less likely to be formed between any of the electric wire conductor 3, the insulation covering 4, and the terminal 5 at the peripheral end of the cured product 7 even when the electric wire is bent, for example, in the processes from the production of the wiring harness to the attachment to a vehicle, thereby maintaining the waterproofness and the anticorrosive effect.

The metal-crosslinkable polymer composition of the present disclosure forming the cured product 7 is applied to the predetermined area. For the application of the metal-crosslinkable polymer composition of the present disclosure forming the cured product 7, known methods such as dripping, and coating can be used.

The cured product 7 is formed at a predetermined thickness in a predetermined area. The thickness is, preferably, 0.1 mm or lower. If the cured product 7 is excessively thick, it is difficult to insert the terminal 5 into a connector.

The electric wire conductor 3 of the covered electric wire 2 is a stranded wire composed of a plurality of elemental wires 3a. In this case, the stranded wire may be composed of a single type of metal elemental wires or two or more types of metal elemental wires. Further, the stranded wire may also contain organic fibers in addition to metal elemental wires. The stranded wire composed of a single type of metal elemental wires means that all metal wires forming the stranded wire are formed of the same metal material, while the stranded wire composed of two or more types of metal elemental wires means that the stranded wire contains metal elemental wires formed of different metal materials. The stranded wire may also include reinforcing wires (i.e., tension members) for reinforcing the covered electric wire 2. Examples of the material of metal elemental wires forming the electric wire conductor 3 include copper, copper alloys, aluminum, aluminum alloys, and materials having various types of plated layers on the metals described above. The material of the metal wires as the reinforcing wires includes, for example, copper alloys, titanium, tungsten, and stainless steels. Further, the organic fibers as the reinforcing wires maybe, for example, KEVLAR. The metal elemental wires forming the electric wire conductor 3 are preferably made of aluminum, aluminum alloys or materials having various types of plated layers on the metals from a viewpoint of reducing the weight.

The material for the insulation covering 4 may be, for example, rubber, polyolefin, PVC, or a thermoplastic elastomer. They may be used alone or two or more of them may be used in combination. Various additives may be added as required to the material of the insulation covering 4. Examples of the additives include flame retardants, fillers, and colorants.

The material for the terminal 5 (i.e., material for a substrate) may be various copper alloys, copper, etc. in addition to generally used brass. The surface of the terminal 5 may be plated with various metals such as tin, nickel, and gold partially (for example, on an area including the contact surface) or entirely.

While a terminal is press-bonded to the end of the electric wire conductor in the terminal-fitted electric wire 1 illustrated in FIG. 2, other known electric connection methods such as welding may also be used instead of the press-bonding connection.

EXAMPLE

The embodiments of the present disclosure are to be described by way of examples but the present disclosure is not restricted to the examples.

<Preparation of the Metal-Crosslinkable Polymer Composition>

(Samples 1 to 11)

A metal-crosslinkable polymer composition was prepared by mixing an ingredient A and an ingredient B in an agate mortar for 5 minutes at room temperature with the composition (mass parts) listed in Table 1.

Comparative Example 1

The ingredient B was used alone without mixing the ingredient A.

Comparative Examples 2-3

Another organic polymer was used instead of the ingredient B.

Comparative Examples 4-8

Another metal-containing compound was used instead of the ingredient A.

Comparative Example 9

An epoxy resin was used.
The following materials were used:
(The ingredient A: an ingredient that releases a metal ion when heated)
Zn-AA: Zinc(II) acetylacetonate (decomposition onset point: 105° C.)
Ca-AA: Calcium (II) acetylacetonate (Phase transition onset point: 110° C.)

Al-AA: Aluminum(III) acetylacetonate (Phase transition onset point: 112° C.)
Al-IP: Aluminum(III) triisopropoxide (Phase transition onset point: 94° C.)
Ca-Met: Calcium (II) methoxide (Phase transition starting point: 101° C.)
Ti-IP: Titanium(IV) tetraisopropoxide (decomposition onset point: 85° C.)

The decomposition point or the phase transition point of the ingredient A is a temperature at which the baseline change starts when differential scanning calorimetry (DSC) (measurement temperature range: 25° C. to 200° C., measured in the air) was performed on each ingredient.
(Other Metal-Containing Compounds)
  ZnO: Zinc oxide (II)
  Zn-St: Zinc Stearate (II)
  Ca-St: Calcium stearate (II)
  Al-St: Aluminum stearate (III)
  $Ca(OH)_2$: Calcium hydroxide (II)

No baseline changes indicating the decomposition point or the phase transition point were observed for the other metal-containing compounds within the above-mentioned measurement temperature range.
(The ingredient B: an organic polymer with a substituent group capable of forming an ionic bond)
MA5: Maleic anhydride-modified liquid polybutadiene (manufactured by CRAY VALLEY), average molecular weight 4700, substituent group equivalent 2350 g/mol
MA13: Maleic anhydride-modified liquid polybutadiene (manufactured by CRAY VALLEY), average molecular weight 2900, substituent group equivalent 730 g/mol
UC3510: Liquid polyacrylate with carboxyl groups (manufactured by TOAGOSEI), average molecular weight 2000, substituent group equivalent 801 g/mol
X-22-3701E: Carboxyl-modified silicone fluid (manufactured by Shin-Etsu Chemical), substituent group equivalent 4000 g/mol
(Other Organic Polymers)
R134: Liquid polybutadiene (manufactured by CRAY VALLEY), average molecular weight 8000, ion-bondable substituent group: none
EPOL: Hydroxyl group-terminated liquid polyolefin (manufactured by Idemitsu Showa Shell), average molecular weight 3330, substituent group equivalent 1650 g/mol
Epoxy resin: Mitsubishi Chemical's "jER828" (epoxy equivalent: 184 to 194), curing agent: Mitsubishi Chemical's "ST12" (amine equivalent: from 345 KOHmg/g or larger and 385 KOHmg/g or smaller), epoxy resin/curing agent=67/33 (parts by mass)

<Evaluation>
(Storage Stability)

Storage stability was evaluated according to whether or not a curing progresses during a preparation of each composition (under room temperature, 5 minutes of mixing). If the curing of the composition progresses during the preparation of the composition, a mixing in an agate mortar becomes difficult due to an increase in viscosity. The composition with excellent storage stability was determined as "E", and the composition with poor storage stability was determined as "N".

(Curing Time)

A copper plate of 50 mm×50 mm×0.5 mm thick is heated in advance to 120° C., and 0.1 g of each of the prepared compositions was dropped onto it. The point at which each composition was dropped onto the heated copper plate was defined as "point of 0 s" (0 second), and the time until the dropped composition was cured was defined as a curing time. The time until each composition cured was defined as a point in time when the composition no longer forms threads when a spatula was applied to the surface of the dropped composition and pulled up. A composition that was found to cure within 60 s was determined to have excellent curing rate (fast curing).

The time until the composition cured was defined as the time when the composition stopped stringing when a spatula was applied to the surface of the dripping composition and pulled up.

Table 1 below summarizes an ingredient composition of each composition (unit: parts by mass) and evaluation results.

TABLE 1

| | | Example | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Ingredient A | Zn-AA | 2.0 | — | — | — | — | — | 2.0 | 2.0 | 2.0 | 0.2 | 20 |
| | Ca-AA | — | 2.0 | — | — | — | — | — | — | — | — | — |
| | Al-AA | — | — | 2.0 | — | — | — | — | — | — | — | — |
| | Al-IP | — | — | — | 2.0 | — | — | — | — | — | — | — |
| | Ca-Met | — | — | — | — | 2.0 | — | — | — | — | — | — |
| | Ti-IP | — | — | — | — | — | 2.0 | — | — | — | — | — |
| Other metal-containing compound | ZnO | — | — | — | — | — | — | — | — | — | — | — |
| | Zn-St | — | — | — | — | — | — | — | — | — | — | — |
| | Ca-St | — | — | — | — | — | — | — | — | — | — | — |
| | Al-St | — | — | — | — | — | — | — | — | — | — | — |
| | $Ca(OH)_2$ | — | — | — | — | — | — | — | — | — | — | — |
| Ingredient B | MA5 | 100 | 100 | 100 | 100 | 100 | 100 | — | — | — | 100 | 100 |
| | MA13 | — | — | — | — | — | — | 100 | — | — | — | — |
| | UC3510 | — | — | — | — | — | — | — | 100 | — | — | — |
| | X-22-3701E | — | — | — | — | — | — | — | — | 100 | — | — |
| Other organic polymer | R134 | — | — | — | — | — | — | — | — | — | — | — |
| | EPOL | — | — | — | — | — | — | — | — | — | — | — |
| | epoxy resin | — | — | — | — | — | — | — | — | — | — | — |
| Storage Stability | | E | E | E | E | E | E | E | E | E | E | E |
| Heating Temperature(° C.) | | 120 | 120 | 120 | 120 | 120 | 120 | 120 | 120 | 120 | 120 | 120 |
| Curing Time(s) | | 40 | 50 | 50 | 30 | 45 | 30 | 40 | 45 | 40 | 55 | 40 |

TABLE 1-continued

|  |  | Comparative Example | | | | | | | | |
|---|---|---|---|---|---|---|---|---|---|---|
|  |  | 1 | 2 | 3 | 4 | 5 | 6 | 7 | 8 | 9 |
| Ingredient A | Zn-AA | — | 2.0 | 2.0 | — | — | — | — | — | — |
|  | Ca-AA | — | — | — | — | — | — | — | — | — |
|  | Al-AA | — | — | — | — | — | — | — | — | — |
|  | Al-IP | — | — | — | — | — | — | — | — | — |
|  | Ca-Met | — | — | — | — | — | — | — | — | — |
|  | Ti-IP | — | — | — | — | — | — | — | — | — |
| Other metal-containing compound | ZnO | — | — | — | 2.0 | — | — | — | — | — |
|  | Zn-St | — | — | — | — | 2.0 | — | — | — | — |
|  | Ca-St | — | — | — | — | — | 2.0 | — | — | — |
|  | Al-St | — | — | — | — | — | — | 2.0 | — | — |
|  | Ca(OH)$_2$ | — | — | — | — | — | — | — | 2.0 | — |
| Ingredient B | MA5 | 100 | — | — | 100 | 100 | 100 | 100 | 100 | — |
|  | MA13 | — | — | — | — | — | — | — | — | — |
|  | UC3510 | — | — | — | — | — | — | — | — | — |
|  | X-22-3701E | — | — | — | — | — | — | — | — | — |
| Other organic polymer | R134 | — | 100 | — | — | — | — | — | — | — |
|  | EPOL | — | — | 100 | — | — | — | — | — | — |
|  | epoxy resin | — | — | — | — | — | — | — | — | 100 |
| Storage Stability |  | E | E | E | E | E | E | E | N | E |
| Heating Temperature(° C.) |  | 120 | 120 | 120 | 120 | 120 | 120 | 120 | 120 | 120 |
| Curing Time(s) |  | >600 | >600 | >600 | >600 | 300 | 480 | 520 | — | 420 |

In Comparative Example 1, since the composition does not contain the ingredient A, the metal ion was not released from the composition when heated, and thus the composition remained as Maleic anhydride-modified liquid polybutadiene, and the composition did not cure even after a heating time exceeded 600 s. In Comparative Example 2, since Liquid polybutadiene without an ion-bondable substituent group was used for the ingredient B, the composition did not cure even after a heating time exceeded 600 s, even though the composition contained the ingredient A. In Comparative Example 3, Liquid polyolefin with a hydroxyl group was used for the ingredient B. Since the hydroxyl group does not form the ionic bond with the metal ion, the composition did not cure even after a heating time exceeded 600 s, even though the composition contained the ingredient A.

In Comparative Example 4, Zinc oxide was used for the ingredient A. Since Zinc oxide does not release the metal ion even when heated, the composition did not cure even after a heating time exceeded 600 s, even though the composition contained the ingredient B. In Comparative Examples 5-7, Fatty acid metal salt was used for the ingredient A. Heating Fatty acid metal salt merely results in a formation of a metal oxide by a thermal decomposition, and thus the metal ion was not released even when the composition was heated, and the composition did not cure even after a heating time exceeded 600 s, even though the composition contained the ingredient B. In Comparative Example 8, Calcium hydroxide was used for the ingredient A. Since the calcium hydroxide releases the metal ion even at room temperature, the curing of the composition was occurred during the preparation of the composition, resulting in showing poor storage stability. In Comparative Example 9, although a commercially-available two-component epoxy resin was used which cures at room temperature, 300 s or more was required to cure even though a curing rate was increased by heat.

On the other hand, in Examples 1-11, since each of the compositions comprises the ingredient A which releases the metal ion when heated, and the ingredient B which comprises the organic polymer having the substituent group capable of forming the ionic bond with the metal ion, excellent storage stability was shown and excellent curing rate was shown such that any one of the compositions cured within 60 s of heating time.

The embodiments of the present disclosure have been described specifically but the present disclosure is no way restricted to the embodiment described above but can be modified variously within a range not departing from the gist of the present disclosure.

DESCRIPTION OF REFERENCE NUMERALS

1 Terminal-fitted electric wire
2 Covered electric wire
2a End of covered electric wire
3 Wiring harness
3a Elemental wire
4 Insulation covering (insulator)
5 Terminal
5a End edge of a terminal
5b Side surface of a terminal
5c Back surface of a terminal
51 Connection part
52 Wire barrel
53 Insulation barrel
54 Electric wire fixing part
6 Electric connection part
7 Cured product

The invention claimed is:
1. A metal-crosslinkable polymer composition, comprising:
ingredient A which releases a metal ion when heated;
ingredient B which comprises an organic polymer having a substituent group capable of forming an ionic bond with the metal ion released from the ingredient A and is in a liquid state at 150° C. or lower, the ingredient B being selected from maleic anhydride-modified liquid polybutadiene, liquid polyacrylate with carboxyl groups, and carboxyl-modified silicone fluid,
wherein the metal crosslinkable polymer composition comprises the ingredient B alone as an organic polymer and is in a droppable state.

2. The metal-crosslinkable polymer composition according to claim 1, wherein the ingredient A has a decomposition point or a phase transition point within a range from 50° C. to 200° C.

3. The metal-crosslinkable polymer composition according to claim 1, wherein the ingredient A is a metal complex.

4. The metal-crosslinkable polymer composition according to claim 1, wherein the ingredient A is a metal complex comprising a multidentate ligand or a crosslinking ligand.

5. The metal-crosslinkable polymer composition according to claim 1, wherein the ingredient A is a metal complex comprising a β-diketonato ligand or an alkoxide ligand.

6. The metal-crosslinkable polymer composition according to claim 1, wherein the metal of the metal ion released from the ingredient A is at least one selected from the group consisting of alkaline earth metals, zinc, titanium, and aluminum.

7. The metal-crosslinkable polymer composition according to claim 1, wherein the ingredient B is in a liquid state at room temperature.

8. The metal-crosslinkable polymer composition according to claim 1, wherein the composition contains 0.2 parts by mass or more and 30 parts by mass or less of the ingredient A with respect to 100 parts by mass of the ingredient B.

9. The metal-crosslinkable polymer composition according to claim 8, wherein the composition contains 0.2 parts by mass or more and 5.0 parts by mass or less of the ingredient A with respect to ingredient B.

10. A metal-crosslinked polymeric material, comprising a crosslinked product of the metal-crosslinkable polymer composition according to claim 1, cured through crosslinking.

11. A metal component, comprising:
a metal base member; and
a coating member covering the surface of the metal base member, comprising the metal-crosslinked polymeric material according to claim 10.

12. A wiring harness, comprising the metal-crosslinked polymeric material according to claim 10.

13. A method for producing a metal-crosslinked polymeric material, comprising heating the metal-crosslinkable polymer composition according to claim 1 to crosslink the ingredient B via the metal ion released from the ingredient A, thereby curing the metal-crosslinkable polymer composition.

* * * * *